United States Patent
Petniunas et al.

(10) Patent No.: US 12,429,561 B2
(45) Date of Patent: Sep. 30, 2025

(54) SENSOR ASSEMBLY

(71) Applicant: Ford Global Technologies, LLC, Dearborn, MI (US)

(72) Inventors: Alexander Petniunas, Canton, MI (US); Venkatesh Krishnan, Canton, MI (US); James Robert Hurd, III, Northville, MI (US); Rashaun Phinisee, Ypsilanti, MI (US); Daniel Klevorn, Westland, MI (US); Michael Robertson, Jr., Garden City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1143 days.

(21) Appl. No.: 17/347,712

(22) Filed: Jun. 15, 2021

(65) Prior Publication Data
US 2022/0397645 A1    Dec. 15, 2022

(51) Int. Cl.
*G01S 7/481* (2006.01)
*G01S 17/10* (2020.01)
*G01S 17/931* (2020.01)

(52) U.S. Cl.
CPC .......... *G01S 7/4813* (2013.01); *G01S 7/4817* (2013.01); *G01S 17/10* (2013.01); *G01S 17/931* (2020.01)

(58) Field of Classification Search
CPC ...... G01S 7/4813; G01S 7/4817; G01S 17/10; G01S 17/931; G01S 7/481; G01S 17/86; B60R 11/00; B60R 16/02
See application file for complete search history.

(56) References Cited

U.S. PATENT DOCUMENTS

| | | | | |
|---|---|---|---|---|
| 10,524,396 B2 * | 12/2019 | Baldovino | ............. | F25B 21/02 |
| 10,908,002 B2 * | 2/2021 | Robertson, Jr. | ........ | G02B 13/06 |
| 12,181,584 B2 * | 12/2024 | Miao | ..................... | G01S 7/4808 |
| 2020/0191614 A1 * | 6/2020 | Ellgas | ..................... | G01D 11/24 |
| 2021/0293932 A1 * | 9/2021 | Bruce-Wen | ........... | G01S 7/4813 |
| 2021/0341584 A1 * | 11/2021 | Ren | ........................ | G01S 7/4813 |
| 2022/0082660 A1 * | 3/2022 | Droz | ..................... | G01S 7/4817 |
| 2022/0221560 A1 * | 7/2022 | Karayacoubian | ..... | G01S 7/4813 |

FOREIGN PATENT DOCUMENTS

| | | |
|---|---|---|
| CN | 101312092 A | 11/2008 |
| CN | 207908673 U | 9/2018 |
| CN | 112660072 A | 4/2021 |

* cited by examiner

*Primary Examiner* — Stephen S Sul
(74) *Attorney, Agent, or Firm* — Frank A. MacKenzie; Brooks Kushman P.C.

(57) ABSTRACT

A sensor assembly includes a housing and a sensor unit attached to the housing. The sensor unit includes a cylindrical shell defining a vertical axis and rotatable around the axis relative to the housing. The cylindrical shell extends upward along the axis from a lower edge. The sensor unit includes a first frustoconical panel fixed to the cylindrical shell, centered on the axis, and extending downward and radially outward from the lower edge. The housing includes a second frustoconical panel centered on the axis, defining a gap with the first frustoconical panel, and defining an airflow outlet from the housing radially inside the second frustoconical panel relative to the axis. The sensor unit defines an airflow inlet radially inside the lower edge relative to the axis and positioned to receive airflow from the airflow outlet. At least one of the frustoconical panels includes a ridge extending into the gap.

20 Claims, 8 Drawing Sheets

SENSOR ASSEMBLY

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

A sensor assembly includes a housing and a sensor unit attached to the housing. The sensor unit includes a cylindrical shell defining a vertical axis. The cylindrical shell is rotatable around the axis relative to the housing. The cylindrical shell includes a lower edge and extending upward along the axis from the lower edge. The sensor unit includes a first frustoconical panel fixed to the cylindrical shell, centered on the axis, and extending downward and radially outward from the lower edge. The housing includes a second frustoconical panel centered on the axis and defining a gap with the first frustoconical panel. The second frustoconical panel defines an airflow outlet from the housing radially inside the second frustoconical panel relative to the axis. The sensor unit defines an airflow inlet radially inside the lower edge relative to the axis and positioned to receive airflow from the airflow outlet. At least one of the frustoconical panels includes a ridge extending into the gap.

The gap may have a constant width extending around the axis.

The at least one of the frustoconical panels may include a plurality of ridges including the ridge, and the ridges may extend into the gap.

The ridge may extend circumferentially around the axis and may be centered on the axis.

The second frustoconical panel may include a plurality of bleed holes positioned to receive airflow directed toward the airflow outlet.

One of the frustoconical panels may include the ridge, and the other of the frustoconical panels may include a channel aligned with the ridge. The ridge may extend circumferentially around the axis and may be centered on the axis, and the channel may extend circumferentially around the axis and may be centered on the axis.

The first frustoconical panel may include the ridge, and the second frustoconical panel may include the channel. The channel may include a plurality of bleed holes positioned to receive airflow directed toward the airflow outlet. The bleed holes may be circumferentially spaced from each other around the axis.

The ridge may be a first ridge, the channel may be a first channel, the bleed holes may be first bleed holes, the first frustoconical panel may include a second ridge, the second frustoconical panel may include a second channel aligned with the second ridge, and the second channel may include a plurality of second bleed holes positioned to receive airflow directed toward the airflow outlet. The first bleed holes may be circumferentially spaced from each other around the axis, the second bleed holes may be circumferentially spaced from each other around the axis, and the second bleed holes may be circumferentially offset from the first bleed holes.

The cylindrical shell may extend above a highest point of the housing.

The sensor assembly may further include a pressurized-air source positioned to discharge airflow through the airflow outlet.

The housing may include an aperture, and the sensor unit may extend through the aperture. The second frustoconical panel may extend radially inward and upward from the aperture.

The sensor unit may include a sensor window, the sensor window may be recessed from the cylindrical shell, and the sensor unit may include a passage positioned to direct airflow from the airflow inlet across the sensor window.

The sensor unit may include a sensor body positioned inside the cylindrical shell and fixed relative to the cylindrical shell, and the sensor body may include a plurality of fins extending radially outward relative to the axis from the sensor body toward the cylindrical shell. The fins may be positioned to receive airflow from the airflow inlet, and the fins may be oriented parallel to the axis.

The cylindrical shell may include a plurality of slits elongated parallel to the axis, and the slits may be positioned to receive airflow from the airflow inlet.

With reference to the Figures, wherein like numerals indicate like parts throughout the several views, a sensor assembly 102 for a vehicle 100 includes a housing 104 and a sensor unit 106 attached to the housing 104. The sensor unit 106 includes a cylindrical shell 108 defining a vertical axis A. The cylindrical shell 108 is rotatable around the axis A relative to the housing 104. The cylindrical shell 108 includes a lower edge 110 and extends upward along the axis A from the lower edge 110. The sensor unit 106 includes a first frustoconical panel 112 fixed to the cylindrical shell 108, centered on the axis A, and extending downward and radially outward from the lower edge 110. The housing 104 includes a second frustoconical panel 114 centered on the axis A and defining a gap G with the first frustoconical panel 112. The second frustoconical panel 114 defines an airflow outlet 116 from the housing 104 radially inside the second frustoconical panel 114 relative to the axis A. The sensor unit 106 defines an airflow inlet 118 radially inside the lower edge 110 relative to the axis A and positioned to receive airflow from the airflow outlet 116. At least one of the frustoconical panels 112, 114 includes at least one ridge 120 extending into the gap G.

The sensor assembly 102 provides both cooling and water management for a rotating sensor unit 106 on a stationary housing 104. The airflow outlet 116 defined by the second frustoconical panel 114 provides a path for airflow into the cylindrical shell 108, where the airflow can cool components of the sensor unit 106. Because the cylindrical shell 108 rotates at a high rate of speed relative to the housing 104, a gap G is present between the cylindrical shell 108 and the housing 104. The close proximity of the frustoconical panels 112, 114 permits only a small amount of the airflow to escape through the gap G between the frustoconical panels 112, 114, making the airflow from the housing 104 to the sensor unit 106 efficient despite the fact that the cylindrical shell 108 moves relative to the housing 104. The ridge or ridges 120 in the gap G between the frustoconical panels 112, 114 slows the airflow by requiring a path with direction changes, which further reduces the quantity of airflow escaping through the gap G. Moreover, the shape of the first frustoconical panel 112 directs fluid such as rain or washer fluid away from the sensor unit 106 without entering the housing 104.

Figure 1:
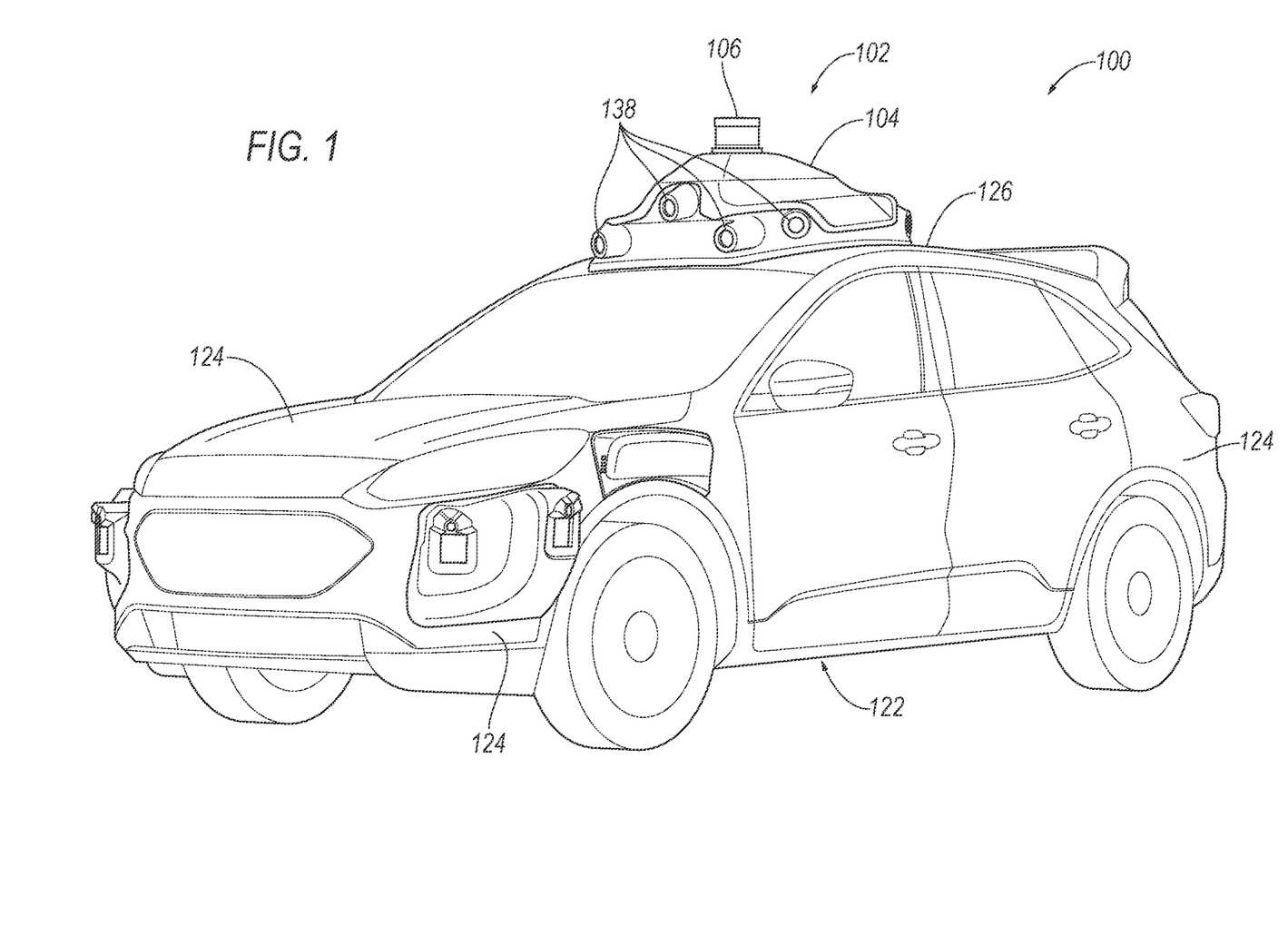
FIG. 1 is a perspective view of an example vehicle with an example sensor assembly.

With reference to FIG. 1, the vehicle 100 may be any suitable type of ground vehicle, e.g., a passenger or commercial automobile such as a sedan, a coupe, a truck, a sport utility, a crossover, a van, a minivan, a taxi, a bus, etc.

The vehicle 100 may be an autonomous vehicle. A computer can be programmed to operate the vehicle 100 independently of the intervention of a human driver, completely or to a lesser degree. The computer may be programmed to operate the propulsion, brake system, steering, and/or other vehicle systems based at least in part on data received from the sensor unit 106. For the purposes of this disclosure, autonomous operation means the computer controls the propulsion device, brake system, and steering system without input from a human driver; semi-autonomous operation means the computer controls one or two of the propulsion system, brake system, and steering system and a human driver controls the remainder; and nonautonomous operation means a human driver controls the propulsion system, brake system, and steering system.

The vehicle 100 may include a vehicle body 122. The vehicle body 122 includes body panels 124 partially defining an exterior of the vehicle 100. The body panels 124 may present a class-A surface, e.g., a finished surface exposed to view by a customer and free of unaesthetic blemishes and defects. The body panels 124 include, e.g., a roof 126, etc.

The sensor assembly 102 is attachable to one of the body panels 124 of the vehicle 100, e.g., the roof 126. For example, the housing 104 may be shaped to be attachable to the roof 126, e.g., may have a shape matching a contour of the roof 126. The housing 104 may be attached to the roof 126, which can provide the sensor unit 106 and other sensors 138 mounted inside the housing 104 with an unobstructed field of view of an area around the vehicle 100. The housing 104 may be formed of, e.g., plastic or metal.

Figure 2:
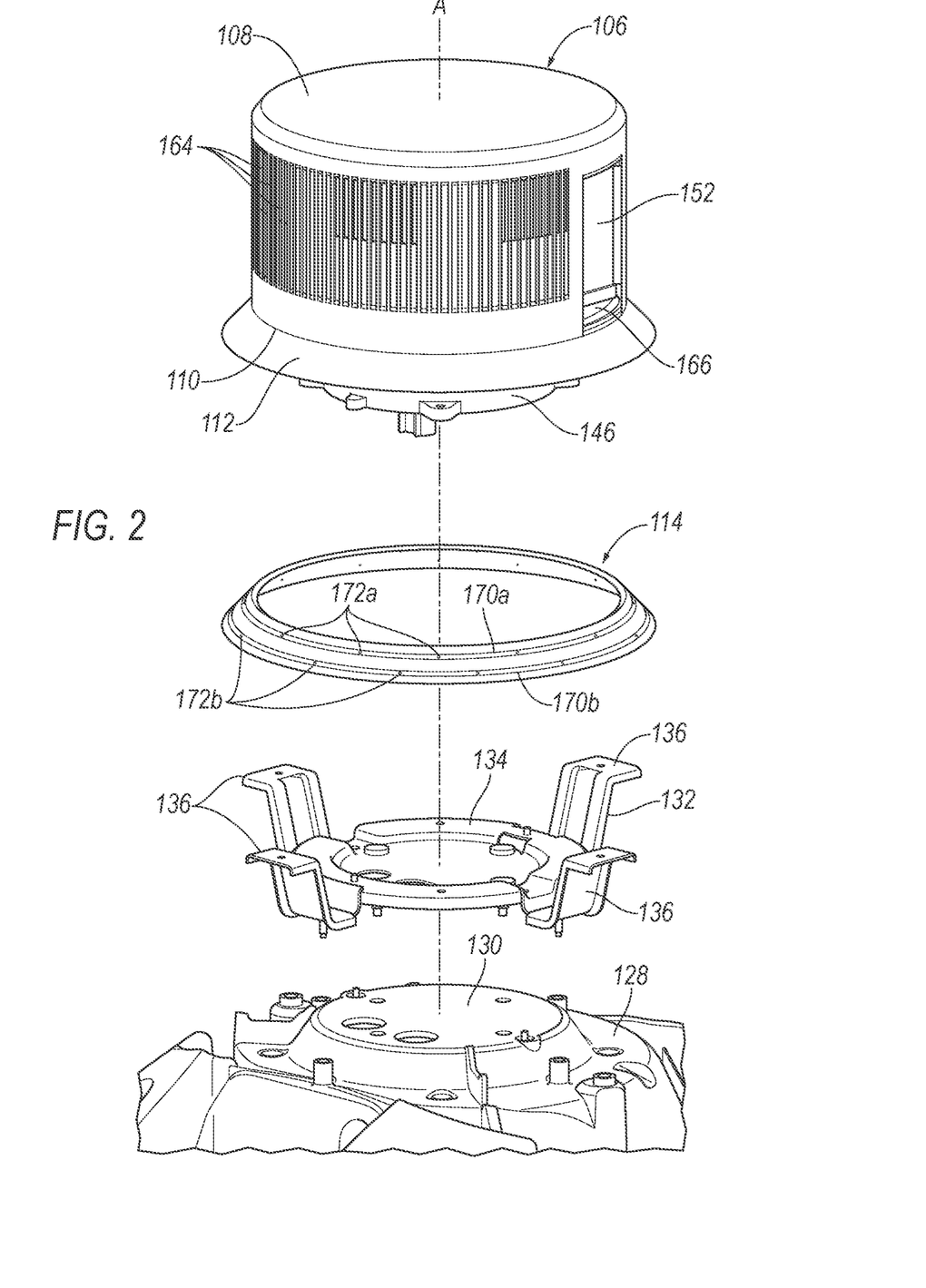
FIG. 2 is an exploded perspective view of a portion of the sensor assembly.
Figure 4:
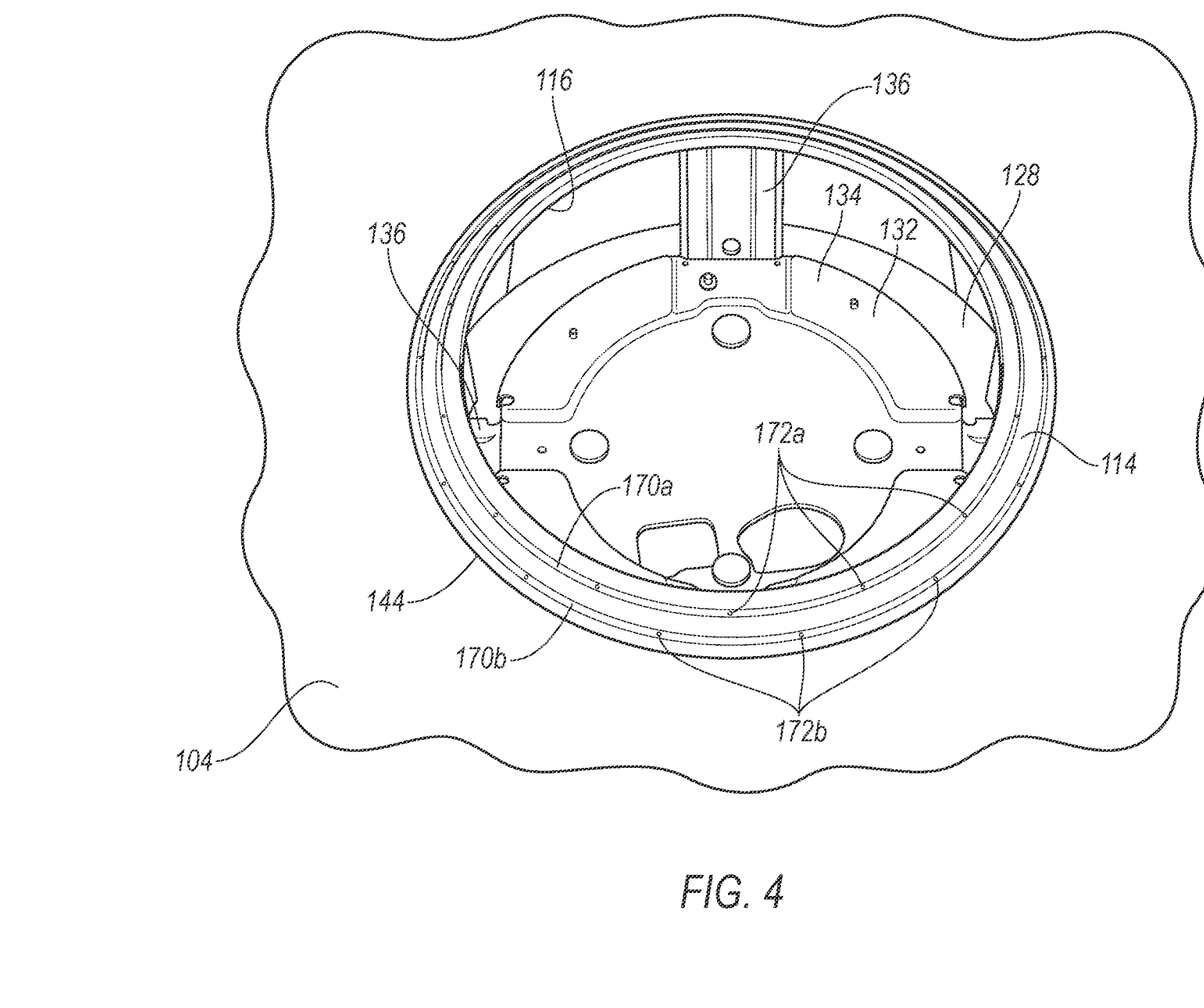
FIG. 4 is a perspective view of a portion of the sensor assembly with a sensor unit removed for illustration.

With reference to FIG. 2, the sensor assembly 102 includes a rigid structure 128. The housing 104 and the rigid structure 128 are shaped to fit together, with the rigid structure 128 positioned inside the housing 104, as seen in FIG. 4. The rigid structure 128 can have a shape matching the contour of the roof 126 like the housing 104 does. The rigid structure 128 can include a mounting platform 130 for directly or indirectly mounting a bracket 132, the second frustoconical panel 114, and the sensor unit 106. The mounting platform 130 can be round, e.g., can have a circular or slightly elliptical shape, and can be centered on the axis A. The mounting platform 130 can be flat and horizontally level. The rigid structure 128 can be a single piece, i.e., a continuous piece of material with no internal seams separating multiple pieces. For example, the rigid structure 128 can be stamped or molded as a single piece.

The sensor assembly 102 includes the bracket 132 mounted to the rigid structure 128, e.g., fastened to the mounting platform 130. The sensor unit 106 can be mounted to the bracket 132, e.g., fastened through the bracket 132 to the mounting platform 130. The bracket 132 can be a single piece, i.e., a continuous piece of material with no internal seams separating multiple pieces. For example, the bracket 132 can be stamped or molded as a single piece.

The bracket 132 is shaped to accept and fix in place the sensor unit 106, e.g., via fastening. The bracket 132 defines an orientation and position of the sensor unit 106 relative to the vehicle body 122 of the vehicle 100. The position of the sensor unit 106 affords the sensor unit 106 a 360° horizontal field of view of the environment surrounding the vehicle 100, as shown in FIG. 1. The bracket 132 can include a circular base 134 centered on the axis A and a plurality of arms 136 extending radially outward and axially upward from the base 134 relative to the axis A.

The sensor assembly 102 includes the second frustoconical panel 114. The second frustoconical panel 114 is fastened to the bracket 132, e.g., to the arms 136 of the bracket 132. The second frustoconical panel 114 is fixed relative to the housing 104 via the bracket 132. The second frustoconical panel 114 has an annular shape centered on the axis A. The shape of the second frustoconical panel 114 is addressed in more detail below.

Figure 3:
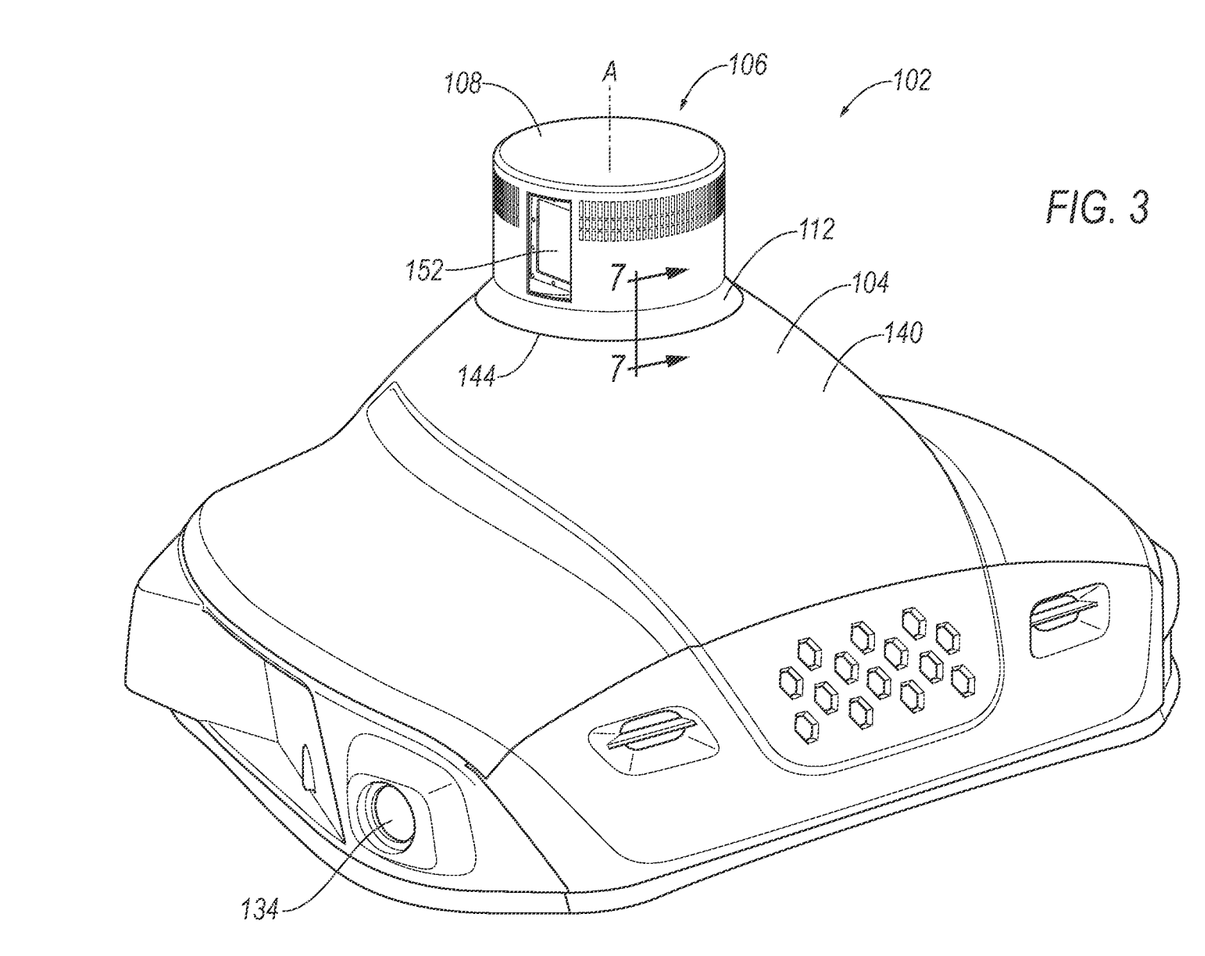
FIG. 3 is a rear perspective view of the sensor assembly.

With reference to FIG. 3, the housing 104 is mounted to the rigid structure 128 and covers the rigid structure 128. The housing 104 contains other sensors 138. The housing 104 includes an upper surface 140 facing away from the rigid structure 128, i.e., away from the vehicle body 122, and a lower surface 142 facing toward the rigid structure 128, i.e., toward the vehicle body 122 (shown in FIGS. 7 and 8). The housing 104 may be a single piece, i.e., a continuous piece of material with no internal seams separating multiple pieces. For example, the housing 104 may be stamped or molded as a single piece.

With reference to FIG. 4, the housing 104 includes an aperture 144 through which the sensor unit 106 passes. In the absence of the sensor unit 106 and the bracket 132, the aperture 144 exposes the rigid structure 128. The aperture 144 is round, e.g., has a circular or slightly elliptical shape. The aperture 144 is centered on the axis A. The aperture 144 of the housing 104 is a highest point of the housing 104.

The second frustoconical panel 114 extends radially inward and upward from the aperture 144 relative to the axis A. The second frustoconical panel 114 has a frustoconical shape, i.e., the shape of a portion of a right circular cone left after removing a portion of the cone above a plane parallel to the cone's base. The second frustoconical panel 114 is radially symmetric around the axis A.

Figure 5:
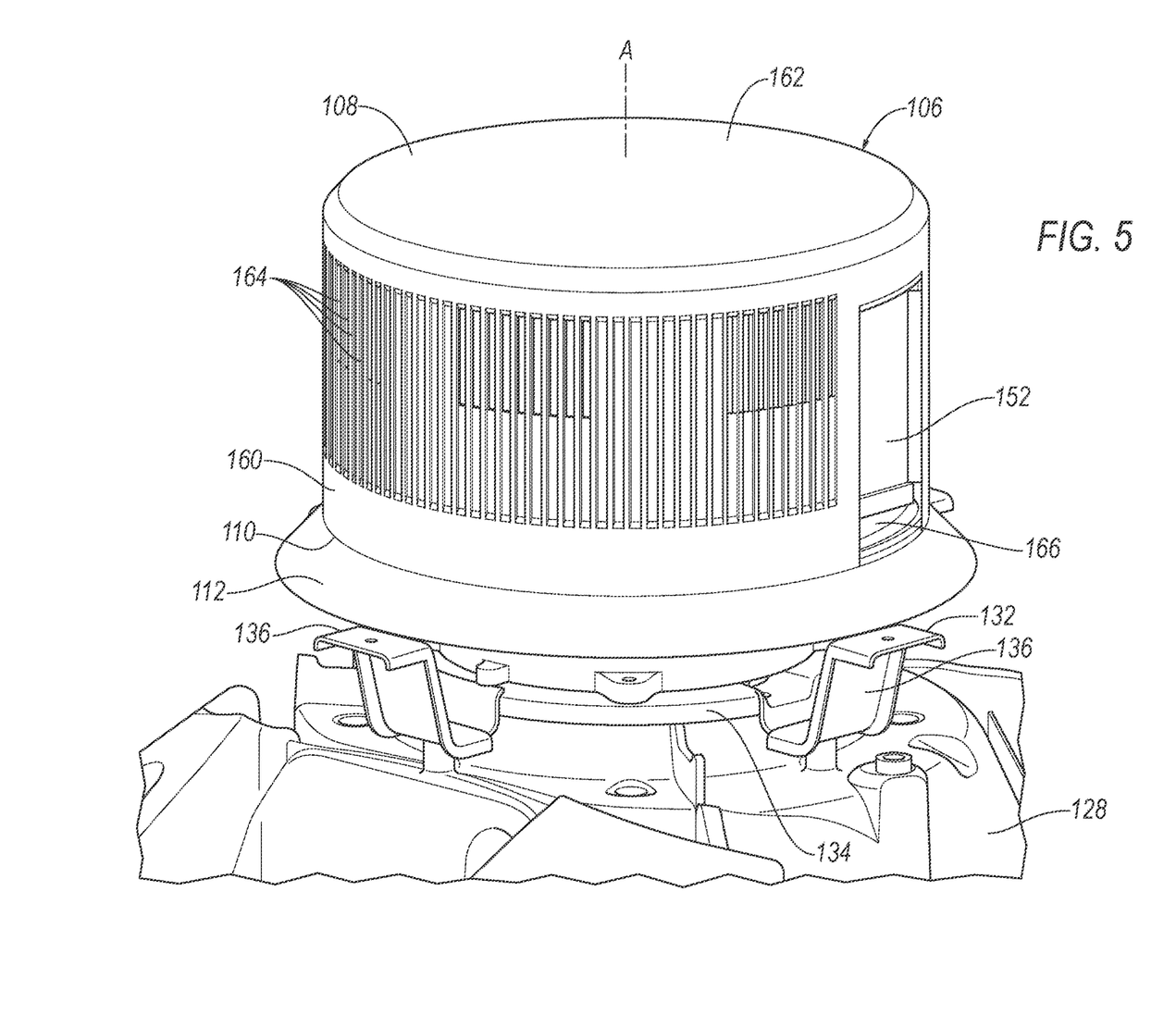
FIG. 5 is a perspective view of a portion of the sensor assembly with a housing removed for illustration.

With reference to FIG. 5, the sensor unit 106 is attached, e.g., fastened, to the bracket 132, e.g., to the base 134 of the bracket 132. For example, the sensor unit 106 can be fastened to the rigid structure 128, e.g., through the base 134 of the bracket 132. The sensor unit 106 extends through the aperture 144, as seen in FIG. 3. The cylindrical shell 108 extends above the aperture 144, i.e., above the highest point of the housing 104.

Returning to FIG. 2, the second frustoconical panel 114 and the sensor unit 106 (including the first frustoconical panel 112) are both attached, e.g., fastened, to the bracket 132. The dimensional tolerancing of the sensor unit 106 relative to the second frustoconical panel 114 is thereby improved. Specifically, the gap G between the second frustoconical panel 114 and the first frustoconical panel 112 of the sensor unit 106 can be kept at an intended size more reliably, permitting the intended size of the gap G to be smaller for less airflow escaping. The dimensional tolerancing can be further improved by the bracket 132 being a single piece, as well as by the second frustoconical panel 114 and the sensor unit 106 directly contacting the bracket 132, i.e., being fastened without intermediate components.

Figure 6:
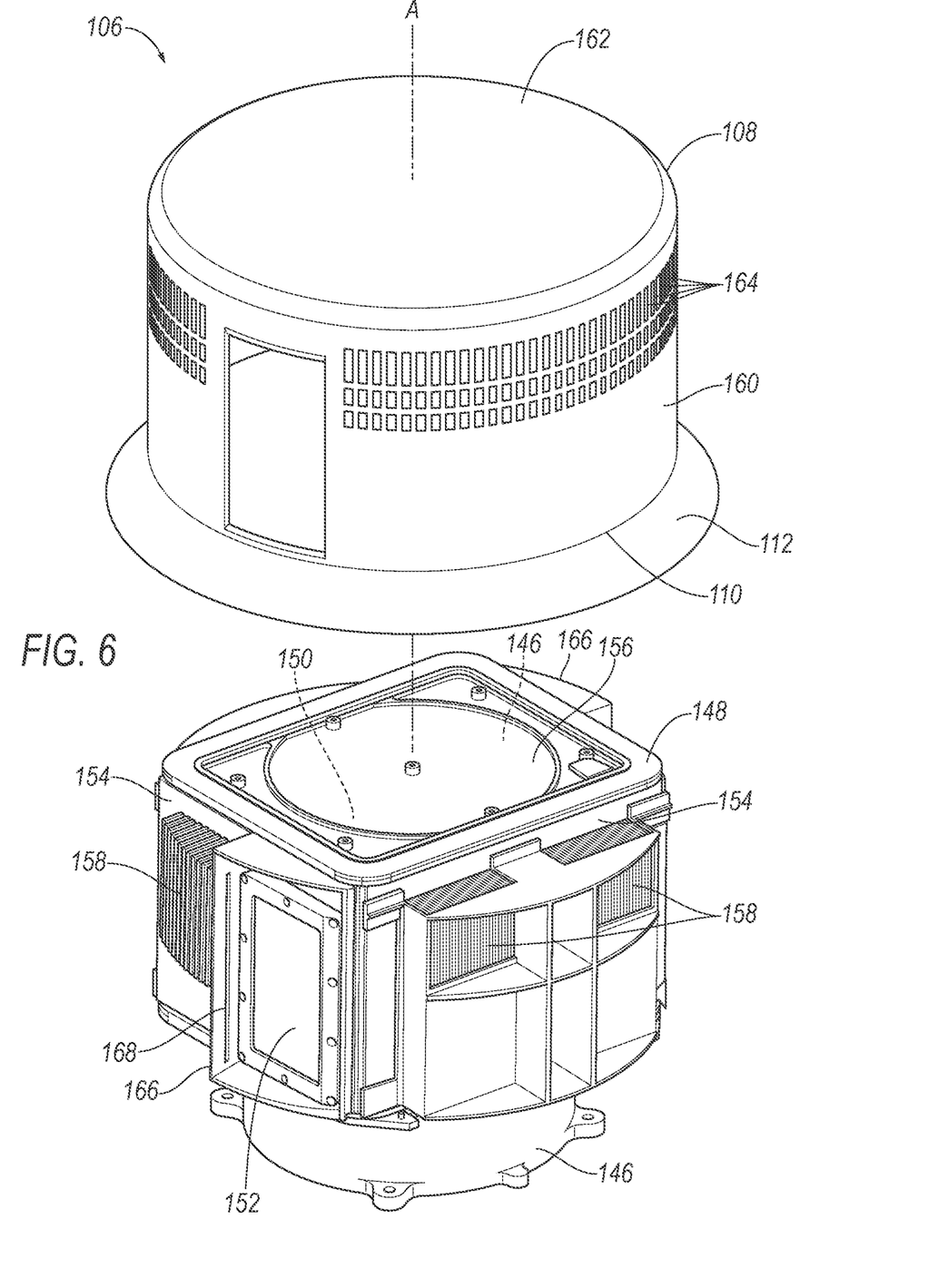
FIG. 6 is an exploded perspective view of the sensor unit.

With reference to FIG. 6, the sensor unit 106 includes a motor 146, a sensor body 148, at least one sensing device 150, at least one sensor window 152, the cylindrical shell 108, and the first frustoconical panel 112. The motor 146 is attached to and fixed relative to the bracket 132, as shown in FIG. 5. The sensor body 148, the at least one sensing device 150, the at least one sensor window 152, the cylindrical shell 108, and the first frustoconical panel 112 are fixed relative to each other and are rotatable around the axis A relative to the housing 104, e.g., by being rotatably drivably coupled to the motor 146.

The motor 146 is fixed relative to the bracket 132 and drivably coupled to the sensor body 148 and thereby drivably coupled to the cylindrical shell 108 and the first frustoconical panel 112. The motor 146 can be any suitable type for rotating the sensing device 150, e.g., an electric motor. For example, the motor 146 can include a stator (not shown) fixed relative to the bracket 132 and a rotor (not shown) rotatable by the stator around the axis A and fixed relative to the sensor body 148.

The sensor body 148 includes walls 154, e.g., four vertical walls 154 as shown in the Figures, and a top panel 156. The walls 154 can have the same horizontal length, i.e., the walls 154 can form a square horizontal cross-section. The horizontal cross-section can be centered on the axis A, i.e., the axis A intersects a geometric center of the horizontal cross-section of the sensor body 148, making the rotation of the sensor body 148 balanced. The top panel 156 extends horizontally to each wall 154. The sensing device 150 is contained inside the sensor body 148. The sensor body 148 is positioned inside the cylindrical shell 108 and fixed relative to the cylindrical shell 108.

The sensor body 148 includes a plurality of fins 158. The fins 158 are positioned on the walls 154. The fins 158 are oriented parallel to the axis A, i.e., axially relative to the axis A, e.g., elongated vertically along the respective wall 154 for the axis A being vertical. The fins 158 can be positioned on all of the walls 154. The fins 158 on each wall 154 extend parallel to each other. The fins 158 can extend perpendicularly from the respective wall 154. Each fin 158 has a length following a direction of elongation of the fin 158 along the wall 154, a width perpendicular to the wall 154, and a thickness in a horizontal direction along the wall 154. The fins 158 extend along their respective widths radially outward relative to the axis A from the sensor body 148 toward the cylindrical shell 108. The length can be significantly greater than the width, e.g., more than twice as great. The width can be significantly greater than the thickness, e.g., more than five times as great. The fins 158 can be integral with the walls 154, i.e., made of a single, uniform piece of material with no seams, joints, fasteners, or adhesives holding it together.

The fins 158 are thermally conductive, i.e., have a high thermal conductivity, e.g., a thermal conductivity equal to at least 15 watts per meter-Kelvin (W/(m K)), e.g., greater than 100 W/(m K), at 25° C. For example, the fins 158, along with the walls 154, may be aluminum. The high thermal conductivity of the fins 158 helps transfer away heat generated by the sensing device 150 inside the sensor body 148, as does the large surface area created by the geometry of the fins 158.

The sensor unit 106 may be designed to detect features of the outside world; for example, the sensor unit 106 may be a radar sensor, a scanning laser range finder, a light detection and ranging (LIDAR) device, or an image processing sensor such as a camera. In particular, the sensor unit 106 may be a LIDAR device, e.g., a scanning LIDAR device. A LIDAR device detects distances to objects by emitting laser pulses at a particular wavelength and measuring the time of flight for the pulse to travel to the object and back. The operation of the sensor unit 106 is performed by the at least one sensing device 150, e.g., a LIDAR sensing device, inside the sensor body 148. For example, the sensor unit 106 can include two sensing devices 150. The sensing devices 150 have fields of view through the sensor windows 152 encompassing a region from which the sensor unit 106 receives input. As the sensing devices 150 rotate, the fields of view encompass a horizontal 360° around the vehicle 100.

The sensor unit 106 can include at least one sensor window 152, e.g., two sensor windows 152, one sensor window 152 for each sensing device 150. The sensor windows 152 are each positioned on one of the walls 154. Each sensor window 152 can be off-center on the respective wall 154. For example, the sensor window 152 can be positioned closer to a trailing edge of the respective wall 154 than a leading edge of the wall 154 with respect to a direction of rotation of the sensor body 148. For example, each sensor window 152 can be positioned in a trailing half of the respective wall 154 with respect to the direction of rotation. The sensor windows 152 can be flat. For example, the sensor windows 152 can have a rectangular shape. The sensor windows 152 are transparent with respect to whatever medium the sensing device 150 is capable of detecting. For example, if the sensor unit 106 is a LIDAR device, then the sensor windows 152 are transparent with respect to visible light at the wavelength generated and detectable by the sensing devices 150.

The cylindrical shell 108 is fixedly attached to the sensor body 148, e.g., fastened to the top panel 156 of the sensor body 148. The cylindrical shell 108 is rotatable around the axis A relative to the housing 104, along with the sensor body 148.

The cylindrical shell 108 includes a cylindrical portion 160 and an end portion 162. The end portion 162 is flat and has a circular shape. The end portion 162 is attached, e.g., fastened, to the top panel 156 of the sensor body 148. The cylindrical portion 160 has a cylindrical shape defining the axis A, which is vertical. The cylindrical portion 160 has a constant circular cross-section extending upward along the axis A from the lower edge 110 to the end portion 162. The cylindrical shell 108 is open at the lower edge 110, thereby permitting airflow into the sensor unit 106 and attachment of the sensor unit 106.

The cylindrical shell 108 includes a plurality of slits 164. The slits 164 extend through the cylindrical portion 160 and are elongated parallel to the axis A. The slits 164 can be positioned radially outward from the fins 158 and are elongated parallel to the fins 158. As described below, the slits 164 permit airflow into the cylindrical shell 108 to exit from the cylindrical shell 108.

The sensor windows 152 are recessed from the cylindrical shell 108. The sensor unit 106 includes window recesses 166 extending from the sensor window 152 and from the respective wall 154 radially outward to the cylindrical shell 108. The window recesses 166 include passages 168 positioned to direct airflow entering the cylindrical shell 108 across the sensor window 152. For example, the passages 168 can be positioned in the direction of rotation of the sensor body 148 from the respective sensor windows 152, i.e., as the sensor body 148 rotates, each passage 168 leads the respective sensor window 152. The passages 168 can extend vertically for a height of the respective sensor windows 152.

The sensor unit 106 includes the first frustoconical panel 112. The first frustoconical panel 112 is fixed to the cylindrical shell 108, e.g., to the lower edge 110 of the cylindrical portion 160 of the cylindrical shell 108. For example, the first frustoconical panel 112 and the cylindrical shell 108 can be a single piece, i.e., a continuous piece of material with no internal seams separating multiple pieces. For example, the first frustoconical panel 112 and the cylindrical shell 108 can be stamped or molded together as a single piece. The first frustoconical panel 112 extends downward and radially outward from the lower edge 110 relative to the axis A. The first frustoconical panel 112 has a frustoconical shape. The first frustoconical panel 112 is centered on the axis A and radially symmetric around the axis A.

Figure 7:
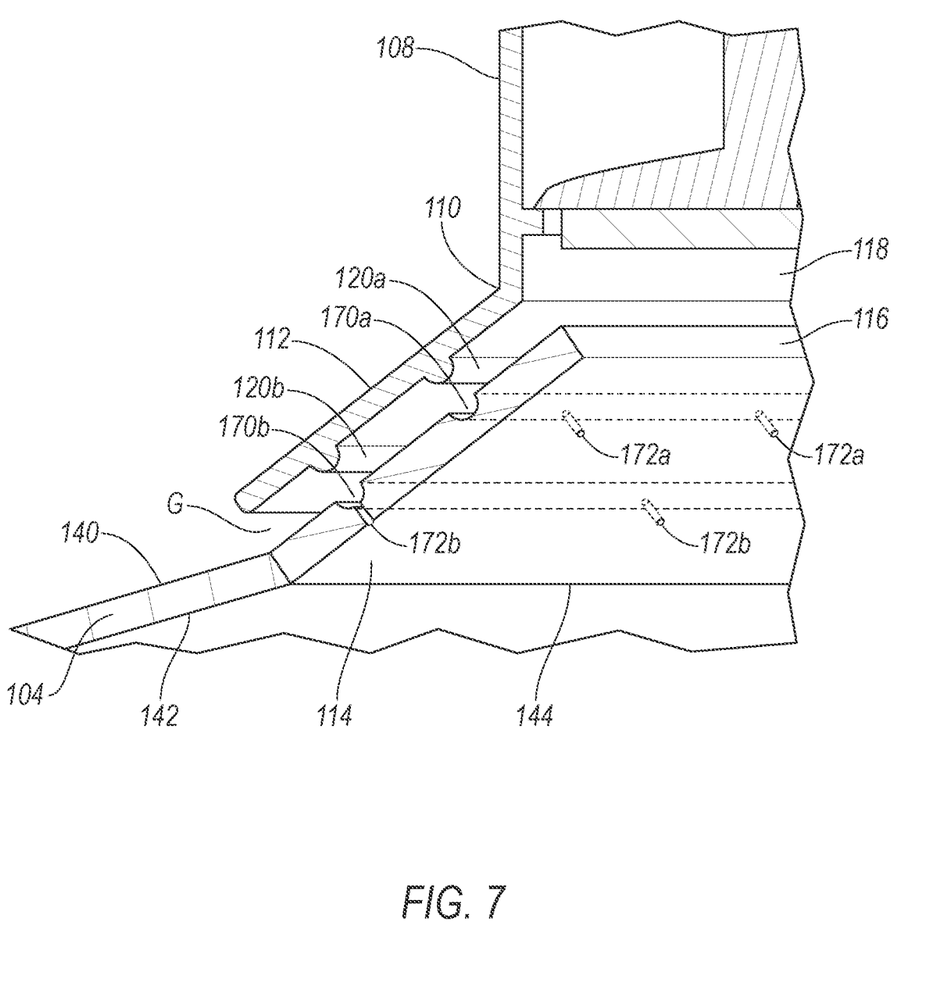
FIG. 7 is a perspective cross-sectional view of a portion of the sensor assembly.

With reference to FIG. 7, the second frustoconical panel 114 defines the gap G with the first frustoconical panel 112. The gap G has a constant width extending around the axis A, e.g., measured along a line perpendicular to the first frustoconical panel 112 and to the second frustoconical panel 114. A distance between the first frustoconical panel 112 and the second frustoconical panel 114 along a line parallel to the axis A is constant around the axis A and is constant from a radially inside edge to a radially outside edge of the first or second frustoconical panel 112, 114. The frustoconical shapes of the first and second frustoconical panels 112, 114 define a same apex angle, i.e., a greatest angle between two lines extending from an apex of a cone.

At least one of the frustoconical panels 112, 114 includes at least one ridge 120, e.g., a plurality of ridges 120, extending into the gap G. For example, as shown in the Figures, the first frustoconical panel 112 includes two ridges 120. The ridges 120 extend circumferentially around the axis A on respective circular paths and are centered on the axis A. The respective circular paths of the ridges 120 have respective diameters. For example, a first ridge 120a has a first diameter, and a second ridge 120b has a second diameter.

The other of the frustoconical panels 112, 114 than the one including the ridges 120 includes at least one channel 170, e.g., a plurality of channels 170. For example, as shown in the Figures, the second frustoconical panel 114 includes two channels 170. The channels 170 extend into the frustoconical panel 112, 114 including the channels 170, e.g., into the second frustoconical panel 114.

The channels 170 extend circumferentially around the axis A on respective circular paths and are centered on the axis A. The respective circular paths of the channels 170 have respective diameters. The channels 170 are aligned with respective ridges 120. For example, a first channel 170a is aligned with the first ridge 120a, e.g., is positioned directly below the first ridge 120a along the axis A, and a second channel 170b is aligned with the second ridge 120b. The channels 170 can have respective diameters equal to the respective diameters of the ridges 120. For example, the first channel 170a has a diameter equal to the first diameter of the first ridge 120a, and the second channel 170b has a diameter equal to the second diameter of the second ridge 120b.

The second frustoconical panel 114, specifically the channels 170, includes a plurality of bleed holes 172 positioned to receive airflow directed toward the airflow outlet 116. For example, the first channel 170a can include first bleed holes 172a, and the second channel 170b can include second bleed holes 172b. The bleed holes 172 are bores that extend through the second frustoconical panel 114 from respective ends in the channels 170 that are open to the gap G to respective other ends that are open to an inside of the housing 104. The bleed holes 172 permit airflow through themselves, and a cross-sectional area of each bleed hole 172 is small enough that airflow moves through the bleed hole 172 at slower than a full speed. By locating the channels 170 on the second frustoconical panel 114 and the ridges 120 on the first frustoconical panel 112, the bleed holes 172 positioned in the channels 170 are positioned to receive the airflow directed toward the airflow outlet 116.

Returning to FIG. 2, the bleed holes 172 are circumferentially spaced from each other around the axis A within each of the channels 170. For example, the first bleed holes 172a are circumferentially spaced from each other around the axis A, and the second bleed holes 172b are circumferentially spaced from each other around the axis A. The bleed holes 172 can be evenly spaced from each other within each channel 170, e.g., angles between consecutive bleed holes 172 in the same channel 170 as measured from the axis A are equal to each other. The second bleed holes 172b are circumferentially offset from the first bleed holes 172a, i.e., circumferential locations of the second bleed holes 172b are between respective circumferential locations of the first bleed holes 172a, e.g., halfway between respective circumferential locations of the first bleed holes 172a.

Figure 8:
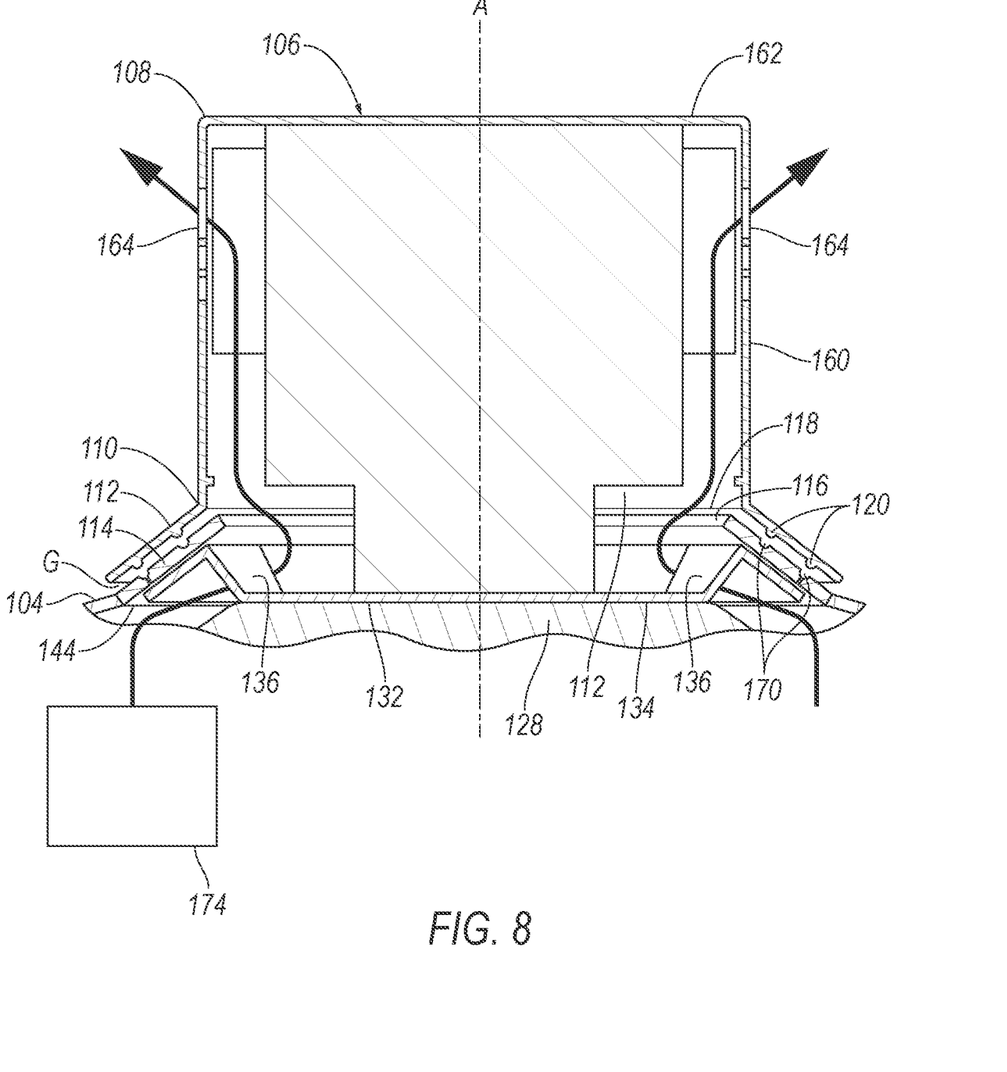
FIG. 8 is a diagrammatic side cross-sectional view of the sensor assembly.

With reference to FIG. 8, the sensor assembly 102 includes a pressurized-air source 174. The pressurized-air source 174 can be positioned inside the housing 104. The pressurized-air source 174 may be any suitable type of blower, e.g., a fan, or suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The pressurized-air source 174 is positioned to discharge airflow between the arms 136 of the bracket 132 and then through the airflow outlet 116. For example, the pressurized-air source 174 can be fluidly connected to a space between the rigid structure 128 and the housing 104 through which the pressurized air can flow to the bracket 132, then between the arms 136, then exiting through the airflow outlet 116. The second frustoconical panel 114 defines the airflow outlet 116 passing radially inside the second frustoconical panel 114 relative to the axis A, e.g., radially inside an inner edge of the second frustoconical panel 114. The airflow outlet 116 passes through the aperture 144.

The sensor unit 106 defines the airflow inlet 118 radially inside the lower edge 110 of the cylindrical shell 108 relative to the axis A. The airflow inlet 118 is positioned to receive airflow from the airflow outlet 116, e.g., the airflow inlet 118 encircles the airflow outlet 116, i.e., the lower edge 110 encircles the radially inner edge of the second frustoconical panel 114. The fins 158 and the slits 164 are positioned to receive airflow from the airflow inlet 118. For example, airflow that passes from the housing 104 through the airflow inlet 118 passes between the fins 158 and then exits the sensor unit 106 through the slits 164. The airflow thus transfers heat from the sensor body 148, thereby cooling the sensor body 148 and the sensing device 150. The airflow is vertical through the airflow inlet 118, and the vertical orientation of the fins 158 and the slits 164 facilitates smooth airflow.

The interface between the first and second frustoconical panels 112, 114 provides for low levels of lost airflow from the housing 104 to the sensor unit 106. To escape, the airflow must pass through the small gap G between the first frustoconical panel 112 and the second frustoconical panel 114, and the airflow must follow a path with direction changes around the ridges 120 and into the respective channels 170. This turning path keeps losses low by slowing airflow speed, while permitting the cylindrical shell 108 and the first frustoconical panel 112 to be spaced from the housing 104 and the second frustoconical panel 114 so that the cylindrical shell 108 can rotate relative to the housing 104. Moreover, the airflow passing through the bleed holes 172 impedes the airflow passing through the gap G between the frustoconical panels 112, 114 by injecting slower-moving air. The circumferential offset between the first bleed holes 172 and the second bleed holes 172 forces the airflow traveling through the gap G to turn in order to get around the slower-moving air coming from the bleed holes 172.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A sensor assembly comprising:
a housing; and
a sensor unit attached to the housing;
the sensor unit including a cylindrical shell defining a vertical axis;
the cylindrical shell being rotatable around the vertical axis relative to the housing;
the cylindrical shell including a lower edge and extending upward along the vertical axis from the lower edge;
the sensor unit including a first frustoconical panel fixed to the cylindrical shell, centered on the vertical axis, and extending downward and radially outward from the lower edge;
the housing including a second frustoconical panel centered on the vertical axis and defining a gap with the first frustoconical panel;
the second frustoconical panel defining an airflow outlet from the housing radially inside the second frustoconical panel relative to the vertical axis;
the sensor unit defining an airflow inlet radially inside the lower edge relative to the vertical axis and positioned to receive airflow from the airflow outlet; and
at least one of the first and second frustoconical panels including a ridge extending into the gap.

2. The sensor assembly of claim 1, wherein the gap has a constant width extending around the vertical axis.

3. The sensor assembly of claim 1, wherein the at least one of the first and second frustoconical panels includes ridges including the ridge, and the ridges extend into the gap.

4. The sensor assembly of claim 1, wherein the ridge extends circumferentially around the vertical axis and is centered on the vertical axis.

5. The sensor assembly of claim 1, wherein the second frustoconical panel includes bleed holes positioned to receive a second airflow directed toward the airflow outlet.

6. The sensor assembly of claim 1, wherein one of the first and second frustoconical panels includes the ridge, and the other of the first and second frustoconical panels includes a channel aligned with the ridge.

7. The sensor assembly of claim 6, wherein the ridge extends circumferentially around the vertical axis and is centered on the vertical axis, and the channel extends circumferentially around the vertical axis and is centered on the vertical axis.

8. The sensor assembly of claim 6, wherein the first frustoconical panel includes the ridge, and the second frustoconical panel includes the channel.

9. The sensor assembly of claim 8, wherein the channel includes bleed holes positioned to receive a second airflow directed toward the airflow outlet.

10. The sensor assembly of claim 9, wherein the bleed holes are circumferentially spaced from each other around the vertical axis.

11. The sensor assembly of claim 9, wherein the ridge is a first ridge, the channel is a first channel, the bleed holes are first bleed holes, the first frustoconical panel includes a second ridge, the second frustoconical panel includes a second channel aligned with the second ridge, and the second channel includes second bleed holes positioned to receive a third airflow directed toward the airflow outlet.

12. The sensor assembly of claim 11, wherein the first bleed holes are circumferentially spaced from each other around the vertical axis, the second bleed holes are circumferentially spaced from each other around the vertical axis, and the second bleed holes are circumferentially offset from the first bleed holes.

13. The sensor assembly of claim 1, wherein the cylindrical shell extends above a highest point of the housing.

14. The sensor assembly of claim 1, further comprising a pressurized-air source positioned to discharge a second airflow through the airflow outlet.

15. The sensor assembly of claim 1, wherein the housing includes an aperture, and the sensor unit extends through the aperture.

16. The sensor assembly of claim 15, wherein the second frustoconical panel extends radially inward and upward from the aperture.

17. The sensor assembly of claim 1, wherein the sensor unit includes a sensor window, the sensor window is recessed from the cylindrical shell, and the sensor unit includes a passage positioned to direct a second airflow from the airflow inlet across the sensor window.

18. The sensor assembly of claim 1, wherein the sensor unit includes a sensor body positioned inside the cylindrical shell and fixed relative to the cylindrical shell, and the sensor body includes fins extending radially outward relative to the vertical axis from the sensor body toward the cylindrical shell.

19. The sensor assembly of claim 18, wherein the fins are positioned to receive a second airflow from the airflow inlet, and the fins are oriented parallel to the vertical axis.

20. The sensor assembly of claim 1, wherein the cylindrical shell includes slits elongated parallel to the vertical axis, and the slits are positioned to receive a second airflow from the airflow inlet.

* * * * *